(12) United States Patent
Clawson et al.

(10) Patent No.: US 10,190,410 B2
(45) Date of Patent: Jan. 29, 2019

(54) METHODS OF ACOUSTICALLY COMMUNICATING AND WELLS THAT UTILIZE THE METHODS

(71) Applicants: Scott William Clawson, Califon, NJ (US); Limin Song, West Windsor, NJ (US); Yibing Zhang, Annandale, NJ (US); Henry Alan Wolf, Morris Plains, NJ (US)

(72) Inventors: Scott William Clawson, Califon, NJ (US); Limin Song, West Windsor, NJ (US); Yibing Zhang, Annandale, NJ (US); Henry Alan Wolf, Morris Plains, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/666,356

(22) Filed: Aug. 1, 2017

(65) Prior Publication Data

US 2018/0058205 A1    Mar. 1, 2018

Related U.S. Application Data

(60) Provisional application No. 62/433,510, filed on Dec. 13, 2016, provisional application No. 62/428,425, filed on Nov. 30, 2016, provisional application No. 62/428,374, filed on Nov. 30, 2016, provisional application No. 62/428,385, filed on Nov. 30, 2016, (Continued)

(51) Int. Cl.
*E21B 19/22* (2006.01)
*E21B 47/16* (2006.01)
*E21B 47/14* (2006.01)
*H04W 52/02* (2009.01)
*H04W 72/04* (2009.01)

(52) U.S. Cl.
CPC ......... *E21B 47/14* (2013.01); *H04W 52/0216* (2013.01); *H04W 72/0446* (2013.01); *H04W 72/0453* (2013.01)

(58) Field of Classification Search
CPC .......... E21B 19/22; E21B 47/14; E21B 47/16; E21B 47/04; E21B 14/122; G01V 11/002; G01V 1/42; G01S 1/725; H03M 7/30; Y10S 367/912
USPC ................... 367/81; 340/855.3, 855.6, 855.4
See application file for complete search history.

(56) References Cited

U.S. PATENT DOCUMENTS 4,962,489 A * 10/1990 Medlin ................. G01H 13/00
                                                        181/105
5,924,499 A    7/1999 Birchak et al.
(Continued)

FOREIGN PATENT DOCUMENTS

EP              2677698 A2    12/2013
WO    WO 2013/079928 A2     6/2013
(Continued)

*Primary Examiner* — Emily C Terrell
(74) *Attorney, Agent, or Firm* — ExxonMobil Upstream Research Company Law Department

(57) ABSTRACT

Methods of acoustically communicating acoustically within a wellbore and wells that utilize the methods are disclosed herein. The methods generally utilize an acoustic wireless network including a plurality of nodes spaced-apart along a length of a tone transmission medium. In some embodiments, the disclosure includes methods of conserving power in the acoustic wireless network.

14 Claims, 9 Drawing Sheets

Related U.S. Application Data provisional application No. 62/428,367, filed on Nov. 30, 2016, provisional application No. 62/381,330, filed on Aug. 30, 2016.

(56) References Cited

U.S. PATENT DOCUMENTS

| | | | |
|---|---|---|---|
| 5,995,449 A | 11/1999 | Green et al. | |
| 6,899,178 B2 | 5/2005 | Tubel | |
| 6,956,791 B2 | 10/2005 | Dopf et al. | |
| 6,980,929 B2 | 12/2005 | Aronstam et al. | |
| 7,249,636 B2 | 7/2007 | Ohmer | |
| 7,411,517 B2 | 8/2008 | Flanagan | |
| 8,237,585 B2 | 8/2012 | Zimmerman | |
| 8,544,564 B2 | 10/2013 | Moore et al. | |
| 8,683,859 B2 | 4/2014 | Godager | |
| 8,689,621 B2 | 4/2014 | Godager | |
| 8,826,980 B2 | 9/2014 | Neer | |
| 8,833,469 B2 | 9/2014 | Purkis | |
| 2009/0003133 A1* | 1/2009 | Dalton | E21B 47/16 367/82 |
| 2013/0248172 A1 | 9/2013 | Angeles Boza et al. | |
| 2014/0152659 A1 | 6/2014 | Davidson et al. | |
| 2014/0266769 A1 | 9/2014 | van Zelm | |
| 2014/0327552 A1 | 11/2014 | Filas et al. | |
| 2014/0352955 A1 | 12/2014 | Tubel et al. | |
| 2015/0003202 A1 | 1/2015 | Palmer et al. | |
| 2015/0009040 A1 | 1/2015 | Bowles et al. | |
| 2015/0027687 A1 | 1/2015 | Tubel | |
| 2015/0179044 A1* | 6/2015 | Wu | G08B 21/20 370/311 |
| 2015/0292319 A1 | 10/2015 | Disko | |
| 2015/0292321 A1* | 10/2015 | Keller | E21B 47/12 367/81 |

FOREIGN PATENT DOCUMENTS

| | | |
|---|---|---|
| WO | WO 2013/112273 A2 | 8/2013 |
| WO | WO 2014/018010 A1 | 1/2014 |
| WO | WO 2014/049360 A2 | 4/2014 |
| WO | WO 2014/134741 A1 | 9/2014 |

\* cited by examiner

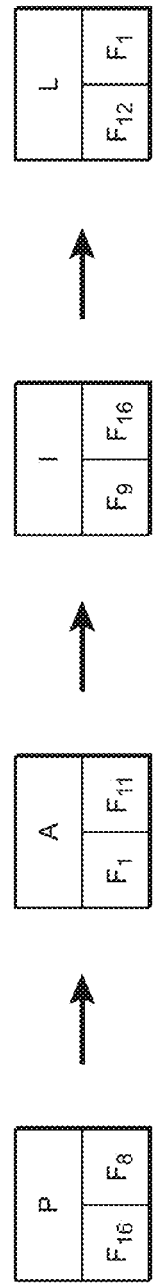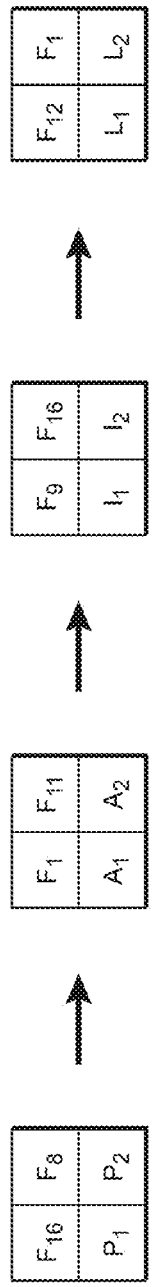
FIG. 5  FIG. 6  FIG. 7  FIG. 8

FIG. 13

| Time Interval | Bin | | | | | | | | | | | | | | Span |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | |
| 1 | 0 | 0 | 0 | 0 | 0 | 0 | 0 | 0 | 0 | 0 | 0 | 0 | 0 | 14 | 4 |
| 2 | 0 | 2 | 0 | 2 | 1 | 1 | 3 | 308 | 0 | 11 | 17 | 6 | 12 | 14 | 13 |
| 3 | 1 | 2 | 0 | 0 | 0 | 1 | 0 | 2 | 0 | 1 | 1 | 8 | 1 | 3 | 14 |
| 4 | 0 | 0 | 0 | 0 | 4 | 2 | 6 | 0 | 6 | 17 | 14 | 193 | 16 | 152 | 9 |
| 5 | 0 | 0 | 0 | 0 | 0 | 1 | 2 | 4 | 0 | 6 | 5 | 110 | 10 | 0 | 9 |
| 6 | 0 | 0 | 0 | 1 | 0 | 0 | 3 | 6 | 3 | 6 | 12 | 4 | 20 | 110 | 11 |
| 7 | 18 | 33 | 23 | 30 | 19 | 34 | 21 | 11 | 18 | 18 | 15 | 15 | 23 | 115 | 14 |
| 8 | 18 | 25 | 23 | 35 | 30 | 46 | 16 | 8 | 16 | 19 | 20 | 18 | 28 | 29 | 14 |
| 9 | 30 | 37 | 52 | 43 | 33 | 44 | 28 | 18 | 18 | 28 | 19 | 27 | 33 | 21 | 14 |
| 10 | 42 | 66 | 22 | 29 | 24 | 30 | 25 | 11 | 21 | 22 | 30 | 26 | 24 | 32 | 14 |

FIG. 14

| Bin | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Total Hits | 0 | 0 | 0 | 0 | 4 | 3 | 8 | 4 | 6 | 23 | 34 | 202 | 42 | 124 |

METHODS OF ACOUSTICALLY COMMUNICATING AND WELLS THAT UTILIZE THE METHODS

CROSS REFERENCE TO RELATED APPLICATIONS

This application is related to and claims benefit of U.S. Provisional Application Ser. No. 62/433,510, filed Dec. 13, 2016 entitled "Methods Of Acoustically Communicating And Wells That Utilize The Methods," U.S. Provisional Application Ser. No. 62/381,330 filed Aug. 30, 2016, entitled "Communication Networks, Relay Nodes for Communication Networks, and Methods of Transmitting Data Among a Plurality of Relay Nodes," U.S. Provisional Application Ser. No. 62/428,367, filed Nov. 30, 2016, entitled "Dual Transducer Communications Node for Downhole Acoustic Wireless Networks and Method Employing Same," U.S. Provisional Application Ser. No. 62/428,374, filed Nov. 30, 2016, entitled "Hybrid Downhole Acoustic Wireless Network," U.S. Provisional Application Ser. No. 62/428,385, filed Nov. 30, 2016 entitled "Methods of Acoustically Communicating And Wells That Utilize The Methods," and U.S. Provisional Application Ser. No. 62/428,425 filed Nov. 30, 2016, entitled "Acoustic Housing for Tubulars," the disclosures of which are incorporated herein by reference in their entireties.

FIELD OF THE DISCLOSURE

The present disclosure relates generally to methods of acoustically communicating and/or to wells that utilize the methods.

BACKGROUND OF THE DISCLOSURE

An acoustic wireless network may be utilized to wirelessly transmit an acoustic signal, such as a vibration, via a tone transmission medium. In general, a given tone transmission medium will only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof.

Under certain circumstances, it may be desirable to transmit data, in the form of acoustic signals, within such a spectrum-constrained environment. However, conventional data transmission mechanisms often cannot be effectively utilized. Thus, there exists a need for improved methods of acoustically communicating and/or for wells that utilize the methods.

SUMMARY OF THE DISCLOSURE

Methods of acoustically communicating and wells that utilize the methods are disclosed herein. The methods generally utilize an acoustic wireless network including a plurality of nodes spaced-apart along a length of a tone transmission medium. In some embodiments, the methods include methods of communicating when the acoustic wireless network is spectrum-constrained. In these embodiments, the methods include encoding an encoded character with an encoding node of the plurality of nodes. The encoding includes selecting a first frequency based upon a first predetermined lookup table and the encoded character, and the transmitting a first transmitted acoustic tone at the first frequency. The encoding further includes selecting a second frequency based upon a second predetermined lookup table and the encoded character, and the transmitting a second transmitted acoustic tone at the second frequency. These methods also include decoding a decoded character with a decoding node of the plurality of nodes. The decoding includes receiving a first received acoustic tone, calculating a first frequency distribution for the first received acoustic tone, and determining a first decoded character distribution for the decoded character. The decoding also includes receiving a second received acoustic tone, calculating a second frequency distribution for the second received acoustic tone, and determining a second decoded character distribution for the decoded character. The decoding further includes identifying the decoded character based upon the first decoded character distribution and the second decoded character distribution.

In other embodiments, the methods include methods of determining a major frequency of a received acoustic tone transmitted via the tone transmission medium. These methods include receiving a received acoustic tone for a tone receipt time and estimating a frequency of the received acoustic tone. These methods also include separating the tone receipt time into a plurality of time intervals and calculating a frequency variation within each of the time intervals. These methods further include selecting a subset of the plurality of time intervals within which the frequency variation is less than a threshold frequency variation and averaging a plurality of discrete frequency values within the subset of the plurality of time intervals to determine the major frequency of the received acoustic tone.

In other embodiments, the methods include methods of conserving power in the acoustic wireless network. These methods include repeatedly and sequentially cycling a given node of the plurality of nodes for a plurality of cycles by entering a lower power state for a lower power state duration and subsequently transitioning to a listening state for a listening state duration. The low-power state duration is greater than the listening state duration. These methods also include transmitting, during the cycling and via a tone transmission medium, a transmitted acoustic tone for a tone transmission duration, receiving a received acoustic tone, and, responsive to the receiving, interrupting the cycling by transitioning the given node to an active state. The tone transmission duration is greater than the low-power state duration such that the acoustic wireless network detects the transmitted acoustic tone regardless of when the transmitting is initiated.

BRIEF DESCRIPTION OF THE DRAWINGS

FIG. 5 is an example of a first predetermined lookup table that may be utilized with the methods according to the present disclosure.

FIG. 6 is an example of a second predetermined lookup table that may be utilized with the methods according to the present disclosure.

FIG. 7 is an example of a plurality of encoded characters and a corresponding plurality of frequencies that may be utilized to convey the encoded characters.

FIG. 8 is an example of a plurality of encoded characters and a corresponding plurality of frequencies that may be utilized to convey the encoded characters.

FIG. 13 is a table illustrating histogram data that may be utilized to determine the major frequency of the received acoustic tone of FIGS. 11-12.

FIG. 14 is a table illustrating a mechanism, according to the present disclosure, by which the major frequency of the acoustic tone of FIGS. 11-12 may be selected.

DETAILED DESCRIPTION AND BEST MODE OF THE DISCLOSURE

Figure 1:
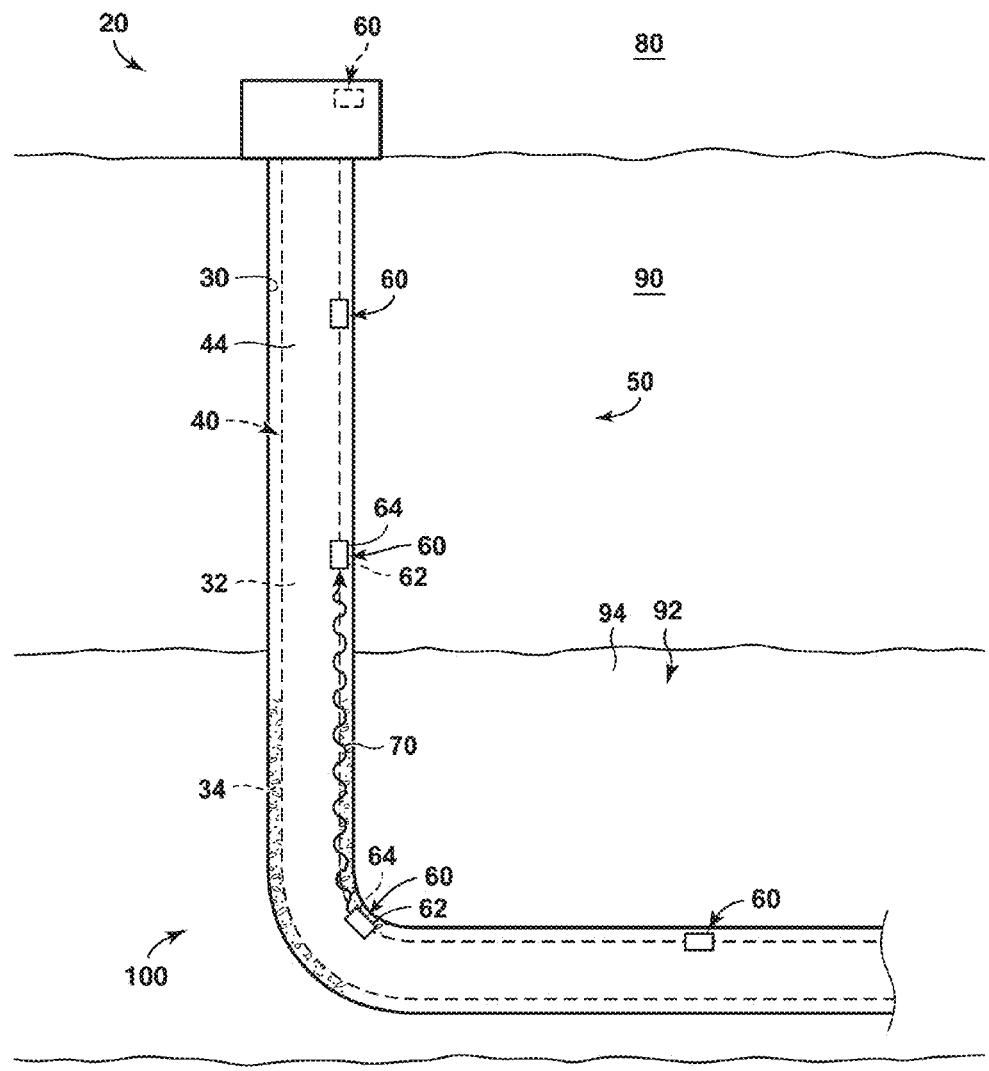
FIG. 1 is a schematic representation of a well configured to utilize the methods according to the present disclosure.

FIGS. 1-16 provide examples of methods 200, 300, and/or 400, according to the present disclosure, and/or of wells 20 including acoustic wireless networks 50 that may include and/or utilize the methods. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic representation of a well 20 configured to utilize methods 200, 300, and/or 400 according to the present disclosure. Well 20 includes a wellbore 30 that extends within a subsurface region 90. Wellbore 30 also may be referred to herein as extending between a surface region 80 and subsurface region 90 and/or as extending within a subterranean formation 92 that extends within the subsurface region. Subterranean formation 92 may include a hydrocarbon 94. Under these conditions, well 20 also may be referred to herein as, or may be, a hydrocarbon well 20, a production well 20, and/or an injection well 20.

Well 20 also includes an acoustic wireless network 50. The acoustic wireless network also may be referred to herein as a downhole acoustic wireless network 50 and includes a plurality of nodes 60, which are spaced-apart along a tone transmission medium 100 that extends along a length of wellbore 30. In the context of well 20, tone transmission medium 100 may include a downhole tubular 40 that may extend within wellbore 30, a wellbore fluid 32 that may extend within wellbore 30, a portion of subsurface region 90 that is proximal wellbore 30, a portion of subterranean formation 92 that is proximal wellbore 30, and/or a cement 34 that may extend within wellbore 30 and/or that may extend within an annular region between wellbore 30 and downhole tubular 40. Downhole tubular 40 may define a fluid conduit 44.

Nodes 60 may include one or more encoding nodes 62, which may be configured to generate an acoustic tone 70 and/or to induce the acoustic tone within tone transmission medium 100. Nodes 60 also may include one or more decoding nodes 64, which may be configured to receive acoustic tone 70 from the tone transmission medium. A given node 60 may function as both an encoding node 62 and a decoding node 64 depending upon whether the given node is transmitting an acoustic tone (i.e., functioning as the encoding node) or receiving the acoustic tone (i.e., functioning as the decoding node). Stated another way, the given node may include both encoding and decoding functionality, or structures, with these structures being selectively utilized depending upon whether or not the given node is encoding the acoustic tone or decoding the acoustic tone.

In wells 20, transmission of acoustic tone 70 may be along a length of wellbore 30. As such, the transmission of the acoustic tone may be linear, at least substantially linear, and/or directed, such as by tone transmission medium 100. Such a configuration may be in contrast to more conventional wireless communication methodologies, which generally may transmit a corresponding wireless signal in a plurality of directions, or even in every direction.

As illustrated in FIG. 1, acoustic wireless network 50 may include nodes 60 that are positioned within wellbore 30. As such, these nodes may be inaccessible, or at least difficult to access. Thus, limiting power consumption, as is discussed herein with reference to methods 400 of FIGS. 15-16, may be important to the operation and/or longevity of the acoustic wireless network.

Method 200, 300, and/or 400, which are discussed in more detail herein, are disclosed in the context of well 20, such as a hydrocarbon well. However, it is within the scope of the present disclosure that these methods may be utilized to communicate via an acoustic tone, such as described in methods 200 of FIGS. 2-8, to determine a major frequency of a received acoustic tone, such as described in methods 300 of FIGS. 9-14, and/or to conserve power, such as described in methods 300 of FIGS. 15-16, in any suitable acoustic wireless network. As examples, methods 200, 300, and/or 400 may be utilized with a corresponding acoustic wireless network in the context of a subsea well and/or in the context of a subsea tubular that extends within a subsea environment. Under these conditions, the tone transmission medium may include, or be, the subsea tubular and/or a subsea fluid that extends within the subsea environment, proximal the subsea tubular, and/or within the subsea tubular. As another example, methods 200, 300 and/or 400 may be utilized with a corresponding acoustic wireless network in the context of a surface tubular that extends within the surface region. Under these conditions, the tone transmission medium may include, or be, the surface tubular and/or a fluid that extends within the surface region, proximal the surface tubular, and/or within the surface tubular.

Figure 2:
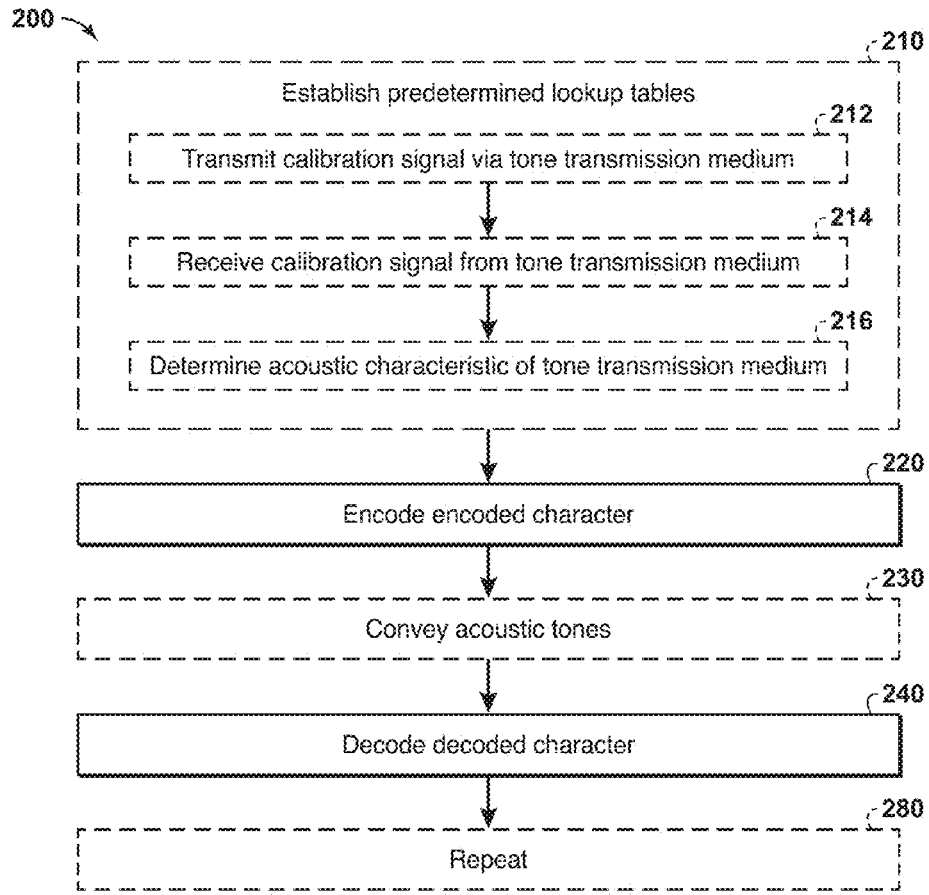
FIG. 2 is a flowchart depicting methods, according to the present disclosure, of communicating in an acoustic wireless network that is spectrum-constrained.

FIG. 2 is a flowchart depicting methods 200, according to the present disclosure, of communicating in an acoustic wireless network that is spectrum-constrained. The acoustic wireless network includes a plurality of nodes spaced-apart along a length of a tone transmission medium. Examples of the acoustic wireless network are disclosed herein with reference to acoustic wireless network 50 of FIG. 1. Examples of the tone transmission medium are disclosed herein with reference to tone transmission medium 100 of FIG. 1.

Figure 3:
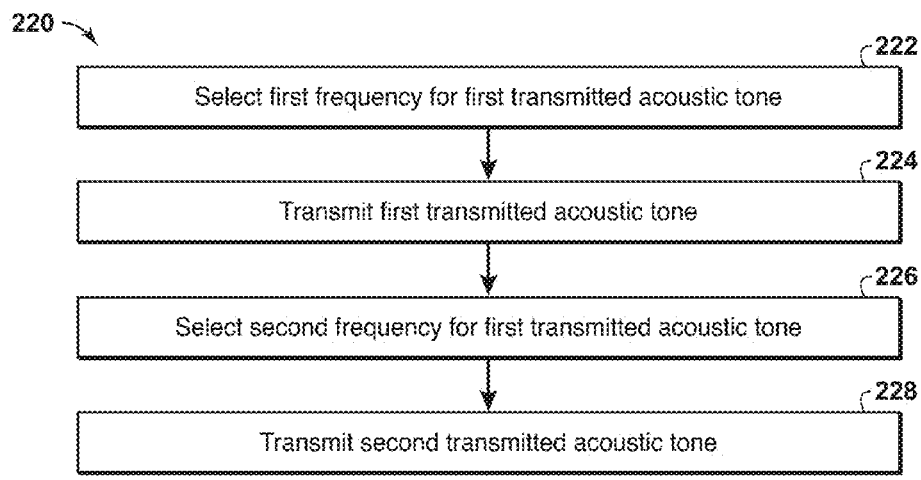
FIG. 3 is a flowchart depicting methods, according to the present disclosure, of encoding an encoded character.

With the above in mind, methods 200 may include establishing predetermined lookup tables at 210 and include encoding an encoded character at 220, which is illustrated in more detail in FIG. 3. Methods 200 further may include conveying an acoustic tone at 230 and include decoding a decoded character at 240, which is illustrated in more detail in FIG. 4. Methods 200 also may include repeating at least a portion of the methods at 280, and FIGS. 5-8 provide schematic examples of various steps of methods 200.

During operation of an acoustic wireless network, such as acoustic wireless network 50 of FIG. 1, methods 200 may be utilized to transmit and/or convey one or more characters and/or pieces of information along, or along the length of, the tone transmission medium. As an example, and as discussed in more detail herein, a first predetermined lookup table 201, as illustrated in FIG. 5, and a second predetermined lookup table 202, as illustrated in FIG. 6, may correlate a plurality of characters, or encoded characters, (e.g., characters A-Q in FIGS. 5-6) to a plurality of frequencies, or frequency ranges (e.g., frequencies $F_1$-$F_{17}$ in FIGS. 5-6). Under these conditions, a character, such as a "P," may be selected for transmission along the length of the tone transmission medium, and methods 200 may be utilized to encode this character into a corresponding frequency and subsequently to decode this character from the corresponding frequency. In the example of FIGS. 5-6, the "P" corresponds to $F_{16}$ in first predetermined lookup table 201 and to $F_8$ in second predetermined lookup table 202. Thus, the encoding at 220 may include transmitting frequency $F_{16}$, via the tone transmission medium and with an encoding node, and subsequently transmitting frequency $F_8$, via the tone transmission medium and with the encoding node, as illustrated in FIG. 7. The decoding at 240 then may include receiving frequency $F_{16}$ and subsequently receiving frequency $F_8$, with a decoding node and from the tone transmission medium, and utilizing first predetermined lookup table 201 and second predetermined lookup table 202, respectively, to decode the received frequencies into their corresponding character (e.g., $P_1$ and $P_2$, as illustrated in FIG. 8). This process may be repeated any suitable number of times to transmit any suitable number of characters, or encoded characters, along the length of the tone transmission medium, as illustrated in FIGS. 7-8 with the corresponding frequencies for transmission of the characters P-A-I-L.

Establishing predetermined lookup tables at 210 may include establishing any suitable predetermined lookup table. This may include establishing the first predetermined lookup table and the second predetermined lookup table, and these predetermined lookup tables may be utilized during the encoding at 220 and/or during the decoding at 240. With this in mind, the establishing at 210, when performed, may be performed prior to the encoding at 220 and/or prior to the decoding at 240.

The establishing at 210 may be accomplished in any suitable manner. As an example, the establishing at 210 may include obtaining the first predetermined lookup table and/or the second predetermined lookup table from any suitable source, such as from a database of lookup tables.

As another example, the establishing at 210 may include generating, or creating, the first predetermined lookup table and/or the second predetermined lookup table. This may include transmitting, at 212, a calibration signal via the tone transmission medium and with an encoding node of the plurality of nodes. This also may include receiving, at 214, the calibration signal from the tone transmission medium and with a decoding node of the plurality of nodes. This further may include determining, at 216, at least one acoustic characteristic of the tone transmission medium. The at least one characteristic of the tone transmission medium may be determined and/or quantified based, at least in part, on the transmitting at 212 and/or on the receiving at 214.

Under these conditions, the establishing at 210 may include establishing the predetermined lookup tables based, at least in part, on the at least one acoustic characteristic of the tone transmission medium. As a more specific example, the establishing at 210 may include determining a bandwidth for acoustic communication within the tone transmission medium. This may include determining a bandwidth, or frequency range, within which the tone transmission medium has less than a threshold ambient acoustic noise level and/or within which the transmitting at 212 and the receiving at 214 may be performed with less than a threshold loss in signal quality, in signal amplitude, and/or in signal intensity between the encoding node and the decoding node.

An example of first predetermined lookup table 201 is illustrated in FIG. 5, while an example of second predetermined lookup table 202 is illustrated in FIG. 6. As illustrated in FIGS. 5-6, predetermined lookup tables 201 and 202 generally correlate a plurality of characters, or encoded characters, such as the letters A through Q that are illustrated in the first row of FIGS. 5-6, with a corresponding plurality of frequencies, or frequency ranges, such as frequencies $F_1$-$F_{17}$ that are illustrated in the second row of FIGS. 5-6.

First predetermined lookup table 201 and second predetermined lookup table 202 differ from one another. More specifically, and as illustrated, the frequency that correlates to a given character differs between first predetermined lookup table 201 and second predetermined lookup table 202. Additionally or alternatively, the first predetermined lookup table and the second predetermined lookup table may be configured such that, for a given character, the corresponding first frequency, as established by first predetermined lookup table 201, is unequal to and/or not a harmonic of the corresponding second frequency, as established by second predetermined lookup table 202. Such a configuration may increase an accuracy of communication when the tone transmission medium transmits one frequency more effectively, with less noise, and/or with less attenuation than another frequency.

It is within the scope of the present disclosure that first predetermined lookup table 201 and second predetermined lookup table 202 may utilize the same encoded characters and the same frequencies, or frequency ranges. Under these conditions, a different frequency, or frequency range, may be correlated to each encoded character in first predetermined lookup table 201 when compared to second predetermined lookup table 202. Additionally or alternatively, it is also within the scope of the present disclosures that at least one frequency, or frequency range, may be included in one of the first predetermined lookup table and the second predetermined lookup table but not in the other lookup table.

The plurality of frequencies utilized in the first predetermined lookup table and in the second predetermined lookup table, including the first frequency and/or the second frequency, may have any suitable value and/or may be within any suitable frequency range. As examples, each frequency in the plurality of frequencies may be at least 10 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of frequencies may be at most 1000 kHz (1 megahertz), at most 800 kHz, at most 600 kHz, at most 400 kHz, at most 200 kHz, at most 150 kHz, at most 100 kHz, and/or at most 80 kHz.

Encoding the encoded character at 220 may include encoding the encoded character with the encoding node. As illustrated in FIG. 3, the encoding at 220 includes selecting a first frequency for a first transmitted acoustic tone at 222, transmitting the first transmitted acoustic tone at 224, selecting a second frequency for a second transmitted acoustic tone at 226, and transmitting the second transmitted acoustic tone at 228.

Selecting the first frequency for the first transmitted acoustic tone at 222 may include selecting based, at least in part, on the encoded character. Additionally or alternatively, the selecting at 222 also may include selecting from the first predetermined lookup table. The first frequency may be correlated to the encoded character in the first predetermined lookup table. As an example, and with reference to FIG. 5, the first encoded character may be a "P," and the first frequency may be $F_{16}$, as indicated in the leftmost box of FIG. 7. The first predetermined lookup table may provide a one-to-one correspondence between the first frequency and the encoded character. Stated another way, each encoded character, and each frequency, may be utilized once and only once in the first predetermined lookup table.

Transmitting the first transmitted acoustic tone at 224 may include transmitting the first transmitted acoustic tone at the first frequency. Additionally or alternatively, the transmitting at 224 also may include transmitting the first transmitted acoustic tone via and/or utilizing the tone transmission medium. The transmitting at 224 further may include transmitting for a first tone-transmission duration.

The transmitting at 224 may be accomplished in any suitable manner. As an example, the transmitting at 224 may include inducing the first acoustic tone, within the tone transmission medium, with an encoding node transmitter of the acoustic wireless network. Examples of the encoding node transmitter include any suitable structure configured to induce a vibration within the tone transmission medium, such as a piezoelectric encoding node transmitter, an electromagnetic acoustic transmitter, a resonant microelectromechanical system (MEMS) transmitter, a non-resonant MEMS transmitter, and/or a transmitter array.

Selecting the second frequency for the second transmitted acoustic tone at 226 may include selecting based, at least in part, on the encoded character. Additionally or alternatively, the selecting at 226 also may include selecting from the second predetermined lookup table. In general, the second predetermined lookup table is different from the first predetermined lookup table and/or the second frequency is different from the first frequency. The second frequency may be correlated to the encoded character in the second predetermined lookup table. As an example, and with reference to FIG. 6, the second frequency may be $F_8$ when the encoded character is "P," as indicated in the leftmost box of FIG. 7. The second predetermined lookup table may provide a one-to-one correspondence between the second frequency and the encoded character. Stated another way, each encoded character, and each frequency, may be utilized once and only once in the second predetermined lookup table.

Transmitting the second transmitted acoustic tone at 228 may include transmitting the first transmitted acoustic tone at the second frequency. Additionally or alternatively, the transmitting at 228 also may include transmitting the second transmitted acoustic tone via and/or utilizing the tone transmission medium. The transmitting at 228 further may include transmitting for a second tone-transmission duration.

The transmitting at 228 may be accomplished in any suitable manner. As an example, the transmitting at 228 may include inducing the second acoustic tone, within the tone transmission medium, with the encoding node transmitter.

Conveying the acoustic tone at 230 may include conveying in any suitable manner. As an example, the decoding node may be spaced-apart from the encoding node such that the tone transmission medium extends between, or spatially separates, the encoding node and the decoding node. Under these conditions, the conveying at 230 may include conveying the first transmitted acoustic tone and/or conveying the second transmitted acoustic tone, via the tone transmission medium, from the encoding node to the decoding node.

The conveying at 230 further may include modifying the first transmitted acoustic tone, via a first interaction with the tone transmission medium, to generate a first received acoustic tone. Additionally or alternatively, the conveying at 230 may include modifying the second transmitted acoustic tone, via a second interaction with the tone transmission medium, to generate a second received acoustic tone. The modifying may include modifying in any suitable manner and may be active (i.e., purposefully performed) or passive (i.e., inherently performed as a result of the conveying). Examples of the modifying include modification of one or more of an amplitude of the first and/or second transmitted acoustic tone, a phase of the first and/or second transmitted acoustic tone, a frequency of the first and/or second transmitted acoustic tone, and/or a wavelength of the first and/or second transmitted acoustic tone. Another example of the modifying includes introducing additional frequency components into the first and/or second transmitted acoustic tone. Examples of mechanisms that may produce and/or generate the modifying include tone reflections, ringing, and/or tone recombination at the encoding node, within the tone transmission medium, and/or at the decoding node.

Figure 4:
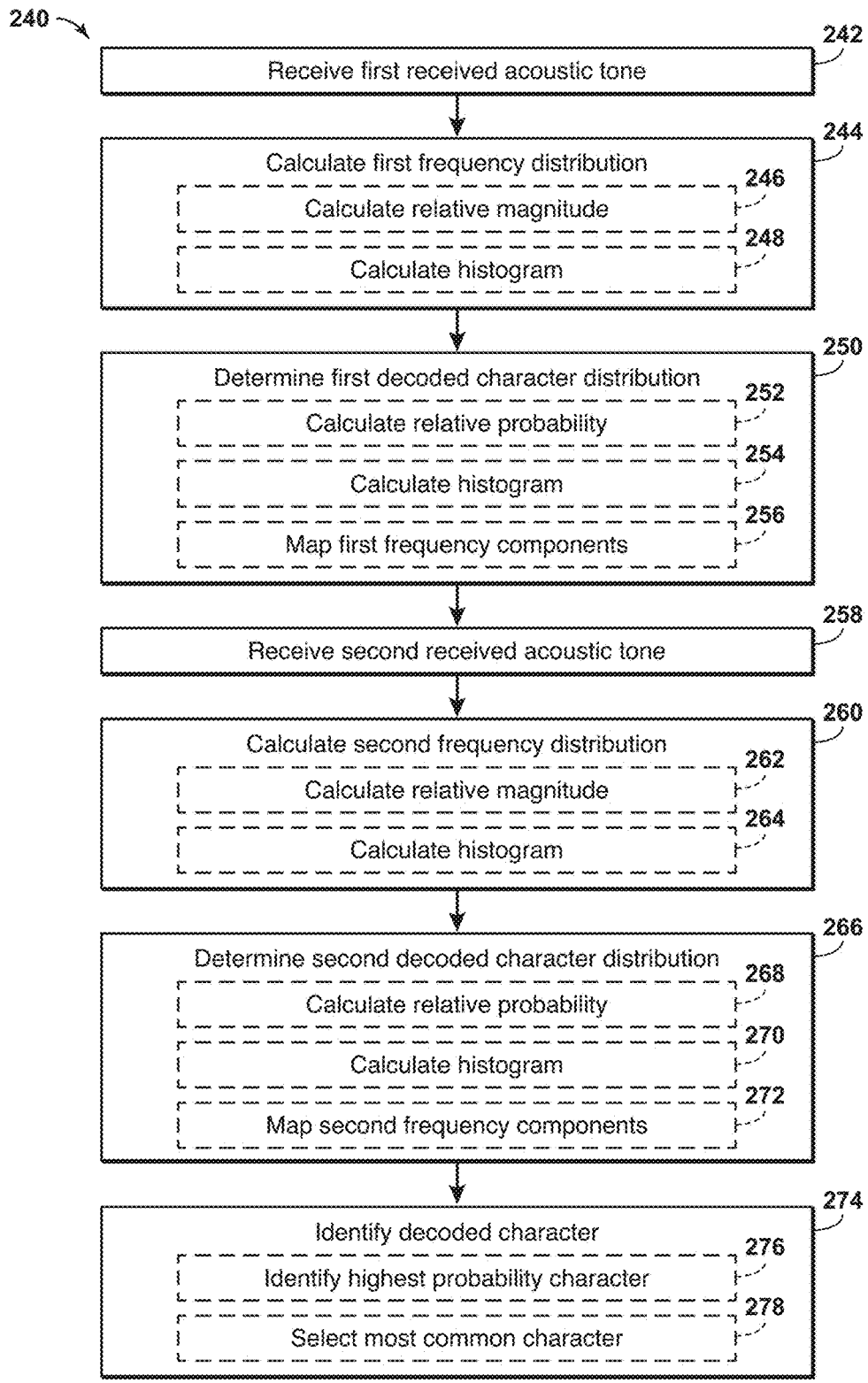
FIG. 4 is a flowchart depicting methods, according to the present disclosure, of decoding a decoded character.

Decoding the decoded character at 240 may include decoding with the decoding node. As illustrated in FIG. 4, the decoding at 240 includes receiving, at 242, the first received acoustic tone, calculating, at 244, a first frequency distribution, and determining, at 250, a first decoded character distribution. The decoding at 240 also includes receiving, at 258, a second received acoustic tone, calculating, at 262, a second frequency distribution, and determining, at 268, a second decoded character distribution. The decoding at 240 further includes identifying, at 274, the decoded character. The decoding at 240 additionally or alternatively may include performing any suitable portion of methods 300, which are discussed herein with reference to FIGS. 9-14.

Receiving the first received acoustic tone at 242 may include receiving the first received acoustic tone with the decoding node and/or from the tone transmission medium and may be performed subsequent to, or responsive to, the transmitting at 224. The receiving at 242 may include receiving the first received acoustic tone for a first tone-receipt duration.

The receiving at 242 may include receiving with any suitable decoding node that is configured to receive the first received acoustic tone from the tone transmission medium. As examples, the receiving at 242 may include receiving with, via, and/or utilizing a piezoelectric decoding node receiver, a piezoresistive receiver, a resonant MEMS receiver, a non-resonant MEMS receiver, and/or a receiver array.

Calculating the first frequency distribution at 244 may include calculating the first frequency distribution for, or of, the first received acoustic tone and may be accomplished in any suitable manner. As examples, the calculating at 244 may include performing a Fourier transform of the first received acoustic tone, performing a fast Fourier transform of the first received acoustic tone, performing a discrete Fourier transform of the first received acoustic tone, performing a wavelet transform of the first received acoustic tone, performing a multiple least squares analysis of the first received acoustic tone, and/or performing a polyhistogram analysis of the first received acoustic tone. Examples of the polyhistogram analysis are disclosed herein with reference to methods 300 of FIG. 9.

It is within the scope of the present disclosure that the first received acoustic tone may include a plurality of first frequency components. These first frequency components may be generated during the transmitting at 224, during the conveying at 230, and/or during the receiving at 242, and examples of mechanisms that may generate the first frequency components are discussed herein with reference to the conveying at 230.

When the first received acoustic tone includes the plurality of first frequency components, the calculating at 244 may include calculating, at 246, a relative magnitude of each of the plurality of first frequency components and/or calculating, at 248, a histogram of the plurality of first frequency components.

Determining the first decoded character distribution at 250 may include determining the first decoded character distribution from the first frequency distribution and/or from the first predetermined lookup table. As an example, the plurality of first frequency components, as calculated during the calculating at 244, may correspond to a plurality of first received characters within first predetermined lookup table 201 of FIG. 5. Stated another way, the determining at 250 may include determining which character from the first predetermined lookup table corresponds to each frequency component in the plurality of first frequency components.

Under these conditions, the determining at 250 may include calculating, at 252, a relative probability that the first received acoustic tone represents each first received character in the plurality of first received characters and/or calculating, at 254, a histogram of the plurality of first received characters. Additionally or alternatively, the determining at 250 may include mapping, at 256, each first frequency component in the plurality of first frequency components to a corresponding character in the first predetermined lookup table.

Receiving the second received acoustic tone at 258 may include receiving the second received acoustic tone with the decoding node and/or from the tone transmission medium and may be performed subsequent, or responsive, to the transmitting at 228. The receiving at 258 may include receiving the second received acoustic tone for a second tone-receipt duration.

Calculating the second frequency distribution at 262 may include calculating the second frequency distribution for, or of, the second received acoustic tone and may be accomplished in any suitable manner. As examples, the calculating at 260 may include performing a Fourier transform of the second received acoustic tone, performing a fast Fourier transform of the second received acoustic tone, performing a discrete Fourier transform of the second received acoustic tone, performing a wavelet transform of the second received acoustic tone, performing a multiple least squares analysis of the second received acoustic tone, and/or performing a polyhistogram analysis of the second received acoustic tone. Examples of the polyhistogram analysis are disclosed herein with reference to methods 300 of FIG. 9.

Similar to the first received acoustic tone, the second received acoustic tone may include a plurality of second frequency components. These second frequency components may be generated during the transmitting at 228, during the conveying at 230, and/or during the receiving at 258, as discussed herein with reference to the calculating at 244.

When the second received acoustic tone includes the plurality of second frequency components, the calculating at 260 may include calculating, at 262, a relative magnitude of each of the plurality of second frequency components and/or calculating, at 264, a histogram of the plurality of second frequency components.

Determining the second decoded character distribution at 268 may include determining the second decoded character distribution from the second frequency distribution and/or from the second predetermined lookup table. As an example, the plurality of second frequency components, as calculated during the calculating at 260, may correspond to a plurality of second received characters within second predetermined lookup table 202 of FIG. 6. Stated another way, the determining at 266 may include determining which character from the second predetermined lookup table corresponds to each frequency component in the plurality of second frequency components.

Under these conditions, the determining at 266 may include calculating, at 268, a relative probability that the second received acoustic tone represents each second received character in the plurality of second received characters and/or calculating, at 270, a histogram of the plurality of second received characters. Additionally or alternatively, the determining at 266 may include mapping, at 272, each second frequency component in the plurality of second frequency components to a corresponding character in the second predetermined lookup table.

Identifying the decoded character at 274 may include identifying the decoded character based, at least in part, on the first decoded character distribution and the second decoded character distribution. The identifying at 274 may be accomplished in any suitable manner. As an example, the identifying at 274 may include identifying which character in the first decoded character distribution has the highest probability of being the encoded character and/or identifying which character in the second decoded character distribution has the highest probability of being the encoded character.

As a more specific example, the identifying at 274 may include combining the first decoded character distribution with the second decoded character distribution to produce and/or generate a composite decoded character distribution and identifying, as indicated at 276, the highest probability character from the composite decoded character distribution. The first decoded character distribution and the second decoded character distribution may be combined in any suitable manner. As an example, the first decoded character distribution and the second decoded character distribution may be summed. As another example, the first decoded character distribution and the second decoded character distribution may be combined utilizing a one-and-one-half moment method. As another more specific example, and as indicated in FIG. 4 at 278, the identifying at 274 may include selecting a most common character from the first decoded character distribution and from the second decoded character distribution.

Repeating at least the portion of the methods at 280 may include repeating any suitable portion of methods 200 in any suitable order. As an example, the encoding node may be a first node of the plurality of nodes, and the decoding node may be a second node of the plurality of nodes. Under these conditions, the repeating at 280 may include repeating the encoding at 220 with the second node and repeating the decoding at 240 with a third node of the plurality of nodes, such as to transmit the encoded character along the length of the tone transmission medium. This process may be repeated a plurality of times to propagate the encoded character among the plurality of spaced-apart nodes. The third node may be spaced-apart from the second node and/or from the first node. Additionally or alternatively, the second node may be positioned between the first node and the third node along the length of the tone transmission medium.

As another example, the encoded character may be a first encoded character, and the decoded character may be a first decoded character. Under these conditions, the repeating at 280 may include repeating the encoding at 220 to encode a second encoded character and repeating the decoding at 240 to decode a second decoded character. This is illustrated in FIGS. 7-8, wherein the characters P-A-I-L sequentially are encoded, as illustrated in FIG. 7, utilizing corresponding frequencies from the first and second predetermined lookup tables of FIGS. 5 and 6. The characters subsequently are decoded, as illustrated in FIG. 8, by comparing the received frequencies to the frequencies from the first and second predetermined lookup tables.

Methods 200 have been described herein as utilizing two predetermined lookup tables (e.g., first predetermined lookup table 201 of FIG. 5 and second predetermined lookup table 202 of FIG. 6). However, it is within the scope of the present disclosure that methods 200 may include and/or utilize any suitable number of frequencies, and corresponding predetermined lookup tables, for a given encoded character. As examples, the encoding at 220 may include selecting a plurality of frequencies for a plurality of transmitted acoustic tones from a corresponding plurality of lookup tables and transmitting the plurality of transmitted acoustic tones via the tone transmission medium. As additional examples, the decoding at 240 may include receiving a plurality of received acoustic tones, calculating a plurality of frequency distributions from the plurality of received acoustic tones, determining, from the plurality of frequency distributions and the plurality of predetermined lookup tables, a plurality of decoded character distributions, and identifying the decoded character based, at least in part, on the plurality of decoded character distributions. The plurality of decoded character distributions may include any suitable number of decoded character distributions, including at least 3, at least 4, at least 6, at least 8, or at least 10 decoded character distributions.

It is within the scope of the present disclosure that methods 200 may be performed utilizing any suitable tone transmission medium and/or in any suitable environment and/or context, including those that are disclosed herein. As an example, and when methods 200 are performed within a well, such as well 20 of FIG. 1, methods 200 further may include drilling wellbore 30. Stated another way, methods 200 may be performed while the wellbore is being formed, defined, and/or drilled. As another example, methods 200 further may include producing a reservoir fluid from subterranean formation 92. Stated another way, methods 200 may be performed while the reservoir fluid is being produced from the subterranean formation.

As discussed herein, the encoding at 220 and/or the decoding at 240 may utilize predetermined lookup tables, such as first predetermined lookup table 201 and/or second predetermined lookup table 202, to map predetermined frequencies, or frequency ranges, to predetermined characters, or encoded characters. As such, methods 200 may be performed without, without utilizing, and/or without the use of a random, or pseudorandom, number generator.

Figure 9:
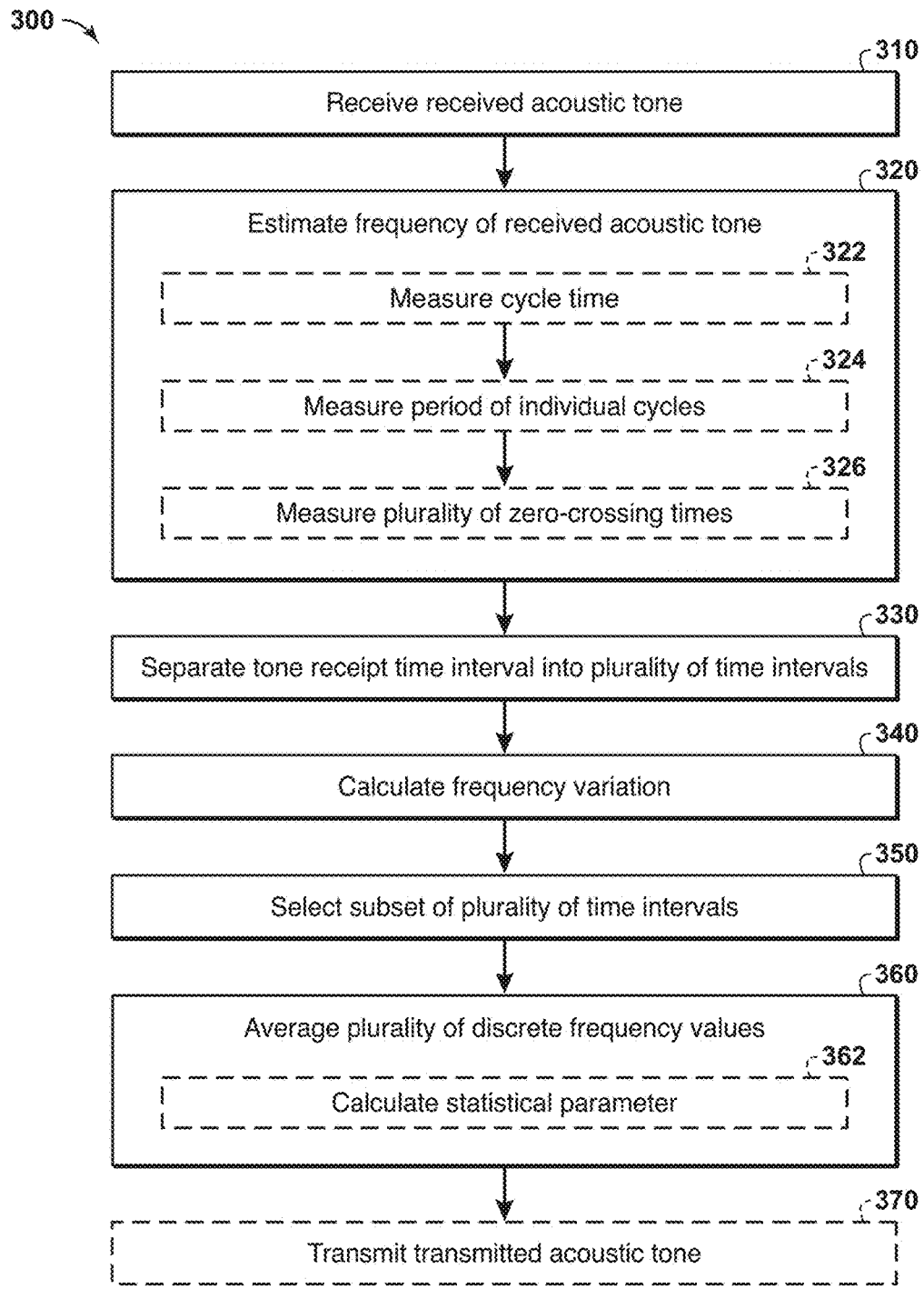
FIG. 9 is a flowchart depicting methods, according to the present disclosure, of determining a major frequency of a received acoustic tone.

FIG. 9 is a flowchart depicting methods 300, according to the present disclosure, of determining a major frequency of a received acoustic tone that is transmitted via a tone transmission medium, while FIGS. 10-14 illustrate various steps that may be performed during methods 300. Methods 300 may be performed utilizing any suitable structure and/or structures. As an example, methods 300 may be utilized by an acoustic wireless network, such as acoustic wireless network 50 of FIG. 1. Under these conditions, methods 300 may be utilized to communicate along a length of wellbore 30.

Methods 300 include receiving a received acoustic tone at 310, estimating a frequency of the received acoustic tone at 320, and separating a tone receipt time into a plurality of time intervals at 330. Methods 300 also include calculating a frequency variation at 340, selecting a subset of the plurality of time intervals at 350, and averaging a plurality of discrete frequency values at 360. Methods 300 further may include transmitting a transmitted acoustic tone at 370.

Receiving the received acoustic tone at 310 may include receiving with a decoding node of an acoustic wireless network. Additionally or alternatively, the receiving at 310 may include receiving from the tone transmission medium and/or receiving for a tone receipt time. The receiving at 310 may include receiving for any suitable tone receipt time. As examples, the tone receipt time may be at least 1 microsecond, at least 10 microseconds, at least 25 microseconds, at least 50 microseconds, at least 75 microseconds, or at least 100 microseconds. The receiving at 310 also may include receiving at any suitable frequency, or tone frequency. Examples of the tone frequency include frequencies of at least 10 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, the tone frequency may be at most 1 megahertz (MHz), at most 800 kHz, at most 600 kHz, at most 400 kHz, at most 200 kHz, at most 150 kHz, at most 100 kHz, and/or at most 80 kHz.

The receiving at 310 may include receiving with any suitable decoding node, such as decoding node 64 of FIG. 1. Additionally or alternatively, the receiving at 310 may include receiving with an acoustic tone receiver. Examples of the acoustic tone receiver include a piezoelectric tone receiver, a piezoresistive tone receiver, a resonant MEMS tone receiver, a non-resonant MEMS tone receiver, and/or a receiver array.

Figure 10:
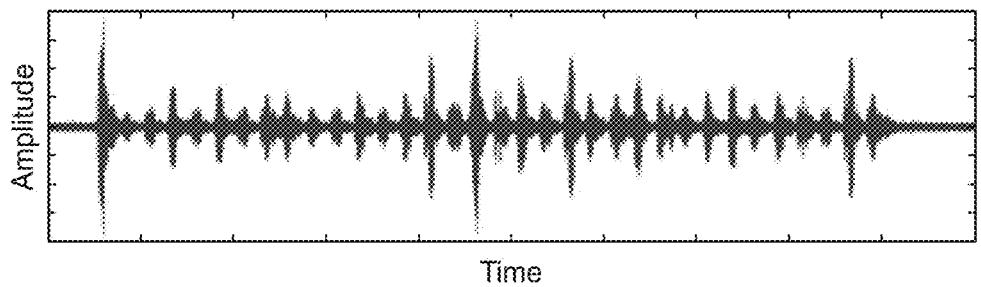
FIG. 10 is a plot illustrating a received amplitude of a plurality of received acoustic tones as a function of time.
Figure 11:
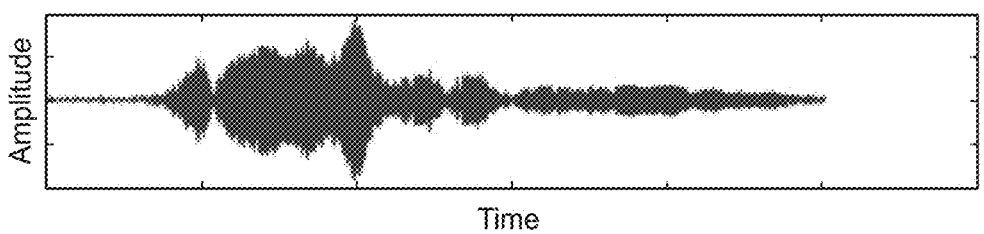
FIG. 11 is a plot illustrating a received amplitude of an acoustic tone from FIG. 10.

An example of a plurality of received acoustic tones is illustrated in FIG. 10, while an example of a single received acoustic tone is illustrated in FIG. 11. FIGS. 10-11 both illustrate amplitude of the received acoustic tone as a function of time (e.g., the tone receipt time). As illustrated in FIGS. 10-11, the amplitude of the received acoustic tone may vary significantly during the tone receipt time. This variation may be caused by non-idealities within the tone transmission medium and/or with the tone transmission process. Examples of these non-idealities are discussed herein and include acoustic tone reflection points within the tone transmission medium, generation of harmonics during the tone transmission process, ringing within the tone transmission medium, and/or variations in a velocity of the acoustic tone within the tone transmission medium. Collectively, these non-idealities may make it challenging to determine, to accurately determine, and/or to reproducibly determine the major frequency of the received acoustic tone, and methods 300 may facilitate this determination.

Estimating the frequency of the received acoustic tone at 320 may include estimating the frequency of the received acoustic tone as a function of time and/or during the tone receipt time. This may include estimating a plurality of discrete frequency values received at a corresponding plurality of discrete times within the tone receipt time and may be accomplished in any suitable manner.

As an example, the received acoustic tone may include, or be, a received acoustic wave that has a time-varying amplitude within the tone receipt time, as illustrated in FIGS. 10-11. The time-varying amplitude may define an average amplitude, and the estimating at 320 may include measuring a cycle time between the time-varying amplitude and the average amplitude, measuring a period of individual cycles of the received acoustic wave, and/or measuring a plurality of zero-crossing times of the received acoustic wave.

Figure 12:
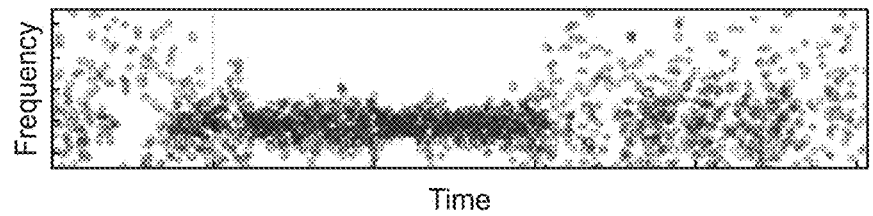
FIG. 12 is a plot illustrating frequency variation in the received acoustic tone of FIG. 11.

The estimating at 320 may be utilized to generate a dataset that represents the frequency of the received acoustic tone as a function of time during the tone receipt time. An example of such a dataset is illustrated in FIG. 12. As may be seen in FIG. 12, the frequency of the received acoustic tone includes time regions where there is a relatively higher amount of variation, such as the time regions from $T_0$ to $T_1$ and from $T_2$ to $T_3$ in FIG. 12, and a time region where there is a relatively lower amount of variation, such as time region from $T_1$ to $T_2$ in FIG. 12.

Separating the tone receipt time into the plurality of time intervals at 330 may include separating such that each time interval in the plurality of time intervals includes a subset of the plurality of discrete frequency values that was received and/or determined during that time interval. It is within the scope of the present disclosure that each time interval in the plurality of time intervals may be less than a threshold fraction of the tone receipt time. Examples of the threshold fraction of the tone receipt time include threshold fractions of less than 20%, less than 15%, less than 10%, less than 5%, or less than 1%. Stated another way, the separating at 330 may include separating the tone receipt time into at least a threshold number of time intervals. Examples of the threshold number of time intervals includes at least 5, at least 7, at least 10, at least 20, or at least 100 time intervals. It is within the scope of the present disclosure that a duration of each time interval in the plurality of time intervals may be the same, or at least substantially the same, as a duration of each other time interval in the plurality of time intervals. However, this is not required to all implementations, and the duration of one or more time interval in the plurality of time intervals may differ from the duration of one or more other time intervals in the plurality of time intervals.

Calculating the frequency variation at 340 may include calculating any suitable frequency variation within each time interval and/or within each subset of the plurality of discrete frequency values. The calculating at 340 may be performed in any suitable manner and/or may calculate any suitable measure of variation, or frequency variation. As an example, the calculating at 340 may include calculating a statistical parameter indicative of variability within each subset of the plurality of discrete frequency values. As another example, the calculating at 340 may include calculating a frequency range within each subset of the plurality of discrete frequency values. As yet another example, the calculating at 340 may include calculating a frequency standard deviation of, or within, each subset of the plurality of discrete frequency values. As another example, the calculating at 340 may include scoring each subset of the plurality of discrete frequency values.

As yet another example, the calculating at 340 may include assessing a margin, or assessing the distinctiveness of a given frequency in a given time interval relative to the other frequencies detected during the given time interval. This may include utilizing a magnitude and/or a probability density to assess the distinctiveness and/or utilizing a difference between a magnitude of a most common histogram element and a second most common histogram element within the given time interval to assess the distinctiveness.

As a more specific example, and when the calculating at 340 includes calculating the frequency range, the calculating at 340 may include binning, or separating, each subset of the plurality of discrete frequency values into bins. This is illustrated in FIG. 13. Therein, a number of times that a given frequency (i.e., represented by bins 1-14) is observed within a given time interval (i.e., represented by time intervals 1-10) is tabulated. A zero value for a given frequency bin-time interval combination indicates that the given frequency bin was not observed during the given time interval, while a non-zero number indicates the number of times that the given frequency bin was observed during the given time interval.

Under these conditions, the calculating at 340 may include determining a span, or range, of the frequency bins. In the example of FIG. 13, the uppermost bin that includes at least one count is bin 14, while the lowermost bin that includes at least one count is bin 11. Thus, the span, or range, is 4, as indicated.

Selecting the subset of the plurality of time intervals at 350 may include selecting a subset within which the frequency variation, as determined during the calculating at 340, is less than a threshold frequency variation. Experimental data suggests that time intervals within which the frequency variation is less than the threshold frequency variation represent time intervals that are more representative of the major frequency of the received acoustic tone. As such, the selecting at 350 includes selectively determining which time intervals are more representative of, or more likely to include, the major frequency of the received acoustic tone, thereby decreasing noise in the overall determination of the major frequency of the received acoustic tone.

The selecting at 350 may include selecting a continuous range within the tone receipt time or selecting two or more ranges that are spaced-apart in time within the tone receipt time. Additionally or alternatively, the selecting at 350 may include selecting at least 2, at least 3, at least 4, or at least 5 time intervals from the plurality of time intervals.

The selecting at 350 additionally or alternatively may include selecting such that the frequency variation within each successive subset of the plurality of discrete frequency values decreases relative to a prior subset of the plurality of discrete frequency values and/or remains unchanged relative to the prior subset of the plurality of discrete frequency values.

An example of the selecting at 350 is illustrated in FIG. 13. In this example, time intervals with a span of less than 10 are selected and highlighted in the table. These include time intervals 1, 4, and 5.

Averaging the plurality of discrete frequency values at 360 may include averaging within the subset of the plurality of time intervals that was selected during the selecting at 350 and/or averaging to determine the major frequency of the received acoustic tone. The averaging at 360 may be accomplished in any suitable manner. As an example, the averaging at 360 may include calculating a statistical parameter indicative of an average of the plurality of discrete frequency values within the subset of the plurality of time intervals. As another example, the averaging at 360 may include calculating a mean, median, or mode value of the plurality of discrete frequency values within the subset of the plurality of time intervals.

As a more specific example, and with reference to FIGS. 13-14, the averaging at 360 may include summing the bins for the time intervals that were selected during the selecting at 350. As discussed, and utilizing one criteria for the selecting at 350, bins 1, 4, and 5 from FIG. 13 may be selected. The number of counts in these three bins then may be summed to arrive at FIG. 14, and the bin with the most counts, which represents the most common, or mode, frequency of the selected time intervals, may be selected. In the example of FIG. 14, this may include selecting bin 12, or the frequency of bin 12, as the major frequency of the received acoustic tone.

Transmitting the transmitted acoustic tone at 370 may include transmitting with an encoding node of the acoustic wireless network. The transmitting at 370 may be subsequent, or responsive, to the averaging at 360; and a transmitted frequency of the transmitted acoustic tone may be based, at least in part, on, or equal to, the major frequency of the received acoustic tone. Stated another way, the transmitting at 370 may include repeating, or propagating, the major frequency of the received acoustic tone along the length of the tone transmission medium, such as to permit and/or facilitate communication along the length of the tone transmission medium.

Figure 15:
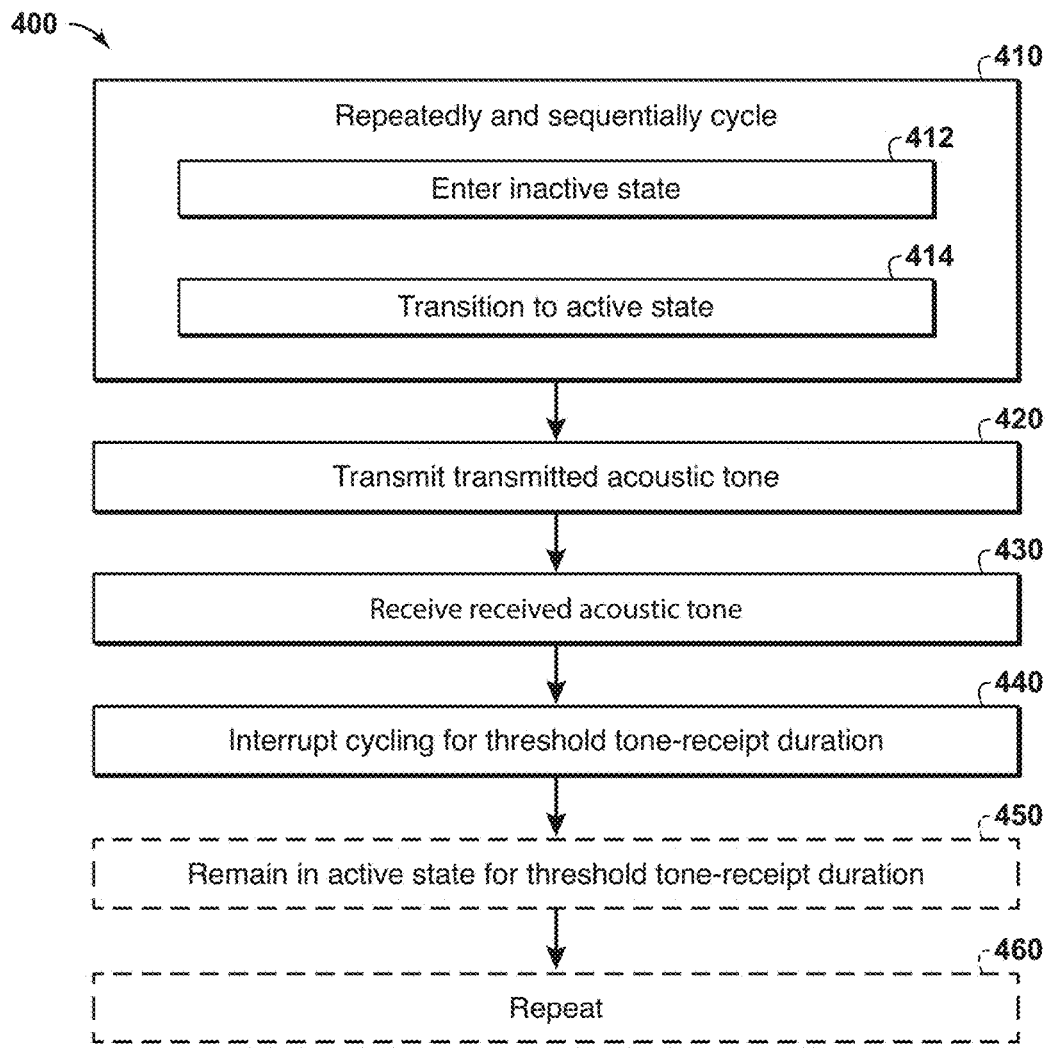
FIG. 15 is a flowchart depicting methods, according to the present disclosure, of conserving power in an acoustic wireless network.
Figure 16:
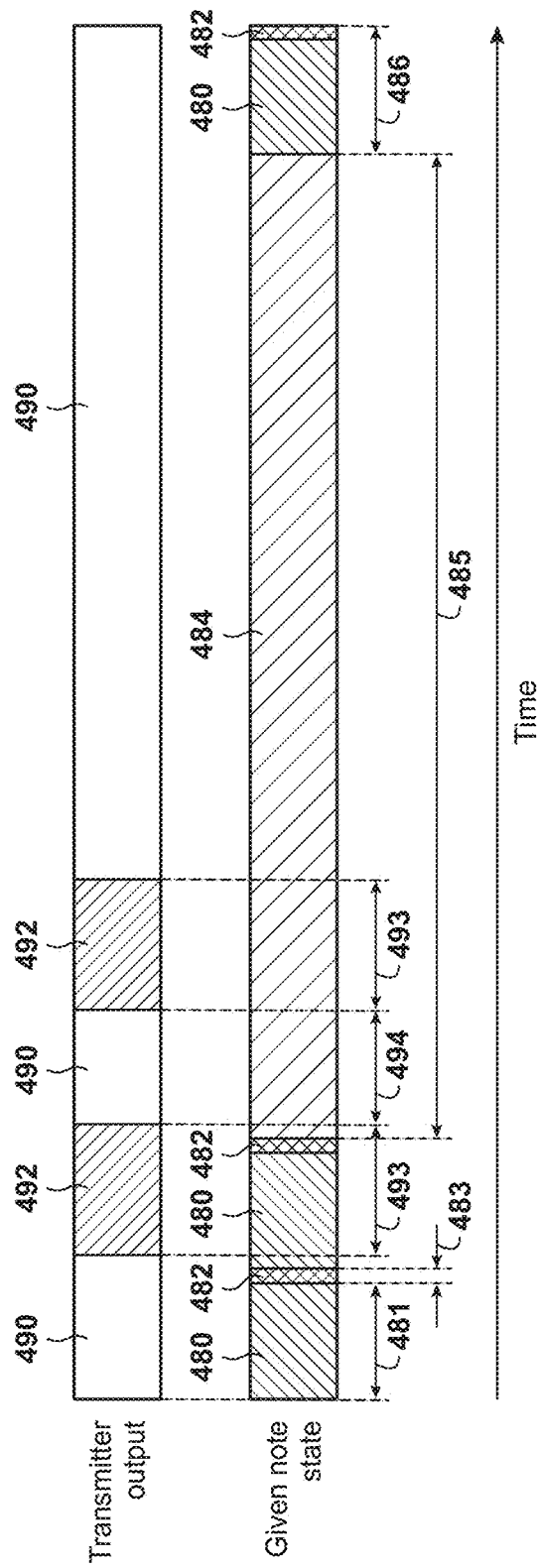
FIG. 16 is a schematic illustration of the method of FIG. 15.

FIG. 15 is a flowchart depicting methods 400, according to the present disclosure, of conserving power in an acoustic wireless network including a plurality of nodes, while FIG. 16 is a schematic illustration of an example of the method of FIG. 15. As illustrated in FIG. 15, methods 400 include repeatedly and sequentially cycling a given node at 410, transmitting a transmitted acoustic tone at 420, receiving a received acoustic tone at 430, and interrupting the cycling for a threshold tone-receipt duration at 440. Methods 400 further may include remaining in an active state for the threshold tone-receipt duration at 450 and/or repeating at least a portion of the methods at 460.

Methods 400 may be performed by an acoustic wireless network, such as acoustic wireless network 50 of FIG. 1. In such a network, at least one node 60 of the plurality of nodes 60 is programmed to perform the cycling at 410 and the receiving at 430, and an adjacent node 60 of the plurality of nodes is programmed to perform the transmitting at 420.

Repeatedly and sequentially cycling the given node at 410 may include cycling the given node for a plurality of cycles. Each cycle in the plurality of cycles includes entering, for a low-power state duration, a low-power state in which the given node is inactive, as indicated at 412. Each cycle in the plurality of cycles further includes subsequently transitioning, for a listening state duration, to a listening state in which a receiver of the given node listens for a received acoustic tone from a tone transmission medium, as indicated at 414.

In general, the low-power state duration is greater than the listening state duration. As examples, the low-power state duration may be at least 2, at least 3, at least 4, at least 6, at least 8, or at least 10 times greater than the listening state duration. As such, the given node may conserve power when compared to a node that might remain in the listening state indefinitely.

An example of the cycling at 410 is illustrated in FIG. 16, which illustrates the state of the given node as a function of time. As illustrated beginning on the leftmost side of FIG. 16, the given node remains in a low-power state 480 for a low power state duration 481 and subsequently transitions to a listening state 482 for a listening state duration 483. As also illustrated, the given node repeatedly cycles between the low-power state and the listening state. Each cycle defines a cycle duration 486, which is a sum of low-power state duration 481 and listening state duration 483.

It is within the scope of the present disclosure that the given node may have, or include, an internal clock. The internal clock, when present, may have and/or exhibit a low-power clock rate when the given node is in the low-power state, a listening clock rate when the given node is in the listening state, and an active clock rate when the given node is in the active state. The low-power clock rate may be less than the listening clock rate, thereby permitting the given node to conserve power when in the low-power state. In addition, the listening clock rate may be less than the active clock rate, thereby permitting the given node to conserve power in the listening state when compared to the active state. It is within the scope of the present disclosure that the listening clock rate may be sufficient to detect, or detect the presence of, the received acoustic tone but insufficient to resolve, or to determine a frequency of, the received acoustic tone. In contrast, the active clock rate may be sufficient to resolve, or detect the frequency of, the received acoustic tone.

Transmitting the transmitted acoustic tone at 420 may include transmitting during the cycling at 410 and/or transmitting via the tone transmission medium. The transmitting at 420 further may include transmitting for a tone transmission duration, and the tone transmission duration is greater than the low-power state duration of the given node. As examples, the tone transmission duration may be at least 110%, at least 120%, at least 150%, at least 200%, or at least 300% of the low-power state duration. Additionally or alternatively, the tone transmission duration may be at least as large as, or even greater than, the cycle duration. Examples of the tone transmission duration include durations of at least 1 millisecond (ms), at least 2 ms, at least 4 ms, at least 6 ms, at least 8 ms, or at least 10 ms.

The transmitting at 420 may be accomplished in any suitable manner. As an example, the transmitting at 420 may include transmitting with a transmitter of another node of the plurality of nodes. The other node of the plurality of nodes may be different from and/or spaced-apart from the given node of the plurality of nodes. Stated another way, the tone transmission medium may extend between, or spatially separate, the given node and the other node.

The transmitting at 420 is illustrated in FIG. 16. As illustrated therein, the transmitter output may include a time period 490 in which there is no transmitted acoustic tone. In addition, the transmitter output also may include a time period 492 in which the transmitter transmits the transmitted acoustic tone for a tone transmission duration 493. Since tone transmission duration 493 is greater than low-power state duration 481, the given node must be in listening state 482 for at least a portion of tone transmission duration 493 regardless of when transmission of the acoustic tone is initiated by the transmitter. As such, the given node cycles between low-power state 480 and listening state 482, thereby conserving power, while, at the same time, always being available to detect, or hear, the transmitted acoustic tone.

Receiving the received acoustic tone at 430 may include receiving during the listening state of a given cycle of the plurality of cycles and with the given node. The receiving at 430 further may include receiving from the tone transmission medium and/or with the receiver of the given node and may be subsequent, or responsive, to the transmitting at 420.

Interrupting the cycling for the threshold tone-receipt duration at 440 may include transitioning the given node to the active state for at least a threshold active state duration and may be subsequent, or responsive, to the receiving at 430. This is illustrated in FIG. 16, with the given node transitioning to an active state 484 and remaining in the active state for a threshold active state duration 485 responsive to the receiving at 430.

The threshold active state duration may be greater than the low-power state duration. As examples, the threshold active state duration may be at least 1.5, at least 2, at least 2.5, at least 3, at least 4, or at least 5 times larger than the low-power state duration, and the interrupting at 440 may permit the given node to receive one or more subsequent transmitted acoustic tones in succession. As an example, the transmitted acoustic tone may be a first transmitted acoustic tone and the method may include transmitting a plurality of transmitted acoustic tones separated by a plurality of pauses, or time periods 490 in which no acoustic tone is transmitted. Each pause may have a pause duration 494, and the interrupting at 440 may include remaining in the active state responsive to the pause duration being less than the threshold active state duration.

Repeating at least the portion of the methods at 460 may include repeating any suitable portion of methods 400 in any suitable manner. As an example, and responsive to not receiving an acoustic tone for the threshold active state duration, the repeating at 460 may include returning to the cycling at 410, thereby conserving power while permitting the given node to detect a subsequent acoustic tone, which might be received from the tone transmission medium subsequent to the given node returning to the cycling at 410.

The acoustic wireless network and/or the nodes thereof, which are disclosed herein, including acoustic wireless network 50 and/or nodes 60 of FIG. 1, may include and/or be any suitable structure, device, and/or devices that may be adapted, configured, designed, constructed, and/or programmed to perform the functions discussed herein with reference to methods 200, 300, and/or 400. As examples, the acoustic wireless network and/or the associated nodes may include one or more of an electronic controller, a dedicated controller, a special-purpose controller, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct the acoustic wireless network and/or the nodes thereof to perform any suitable portion, or subset, of methods 200, 300, and/or 400. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The wells and methods disclosed herein are applicable to the acoustic wireless communication, to the hydrocarbon exploration, and/or to the hydrocarbon production industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of conserving power in an acoustic wireless network including a plurality of nodes, the method comprising:
repeatedly and sequentially cycling a given node of the plurality of nodes for a plurality of cycles by:
(i) entering, for a low-power state duration, a low-power state in which the given node is inactive; and
(ii) transitioning, for a listening state duration, to a listening state in which a receiver of the given node listens for a received acoustic tone from a tone transmission medium, wherein the low-power state duration is greater than the listening state duration;
transmitting, during the cycling, and via the tone transmission medium, a transmitted acoustic tone for a tone transmission duration, wherein the tone transmission duration is greater than the low-power state duration of the given node;
receiving, during the listening state of a given cycle of the plurality of cycles and with the receiver of the given node, the received acoustic tone from the tone transmission medium, wherein the receiving is subsequent to the transmitting; and
responsive to the receiving, interrupting the cycling by transitioning the given node to an active state for at least a threshold active state duration.

2. The method of claim 1, wherein the low-power state duration is at least 3 times the listening state duration.

3. The method of claim 1, wherein each cycle in the plurality of cycles defines a cycle duration that is a sum of the low-power state duration and the listening state duration, and further wherein the tone transmission duration is at least as large as the cycle duration.

4. The method of claim 1, wherein the given node includes an internal clock, wherein the internal clock has a low-power clock rate when the given node is in the low-power state, wherein the internal clock has a listening clock rate when the given node is in the listening state, wherein the internal clock has an active clock rate when the given node is in the active state, and further wherein the low-power clock rate is less than the listening clock rate.

5. The method of claim 4, wherein the listening clock rate is less than the active state clock rate.

6. The method of claim 5, wherein the listening clock rate is sufficient to detect the received acoustic tone but insufficient to resolve the received acoustic tone, and further wherein the active clock rate is sufficient to resolve the received acoustic tone.

7. The method of claim 1, wherein the transmitting includes transmitting with a transmitter of another node of the plurality of nodes.

8. The method of claim 1, wherein the tone transmission duration is at least 110% of the low-power state duration.

9. The method of claim 1, wherein the tone transmission duration is at least 1 millisecond.

10. The method of claim 1, wherein the threshold active state duration is at least 2 times the low-power state duration.

11. The method of claim 1, wherein the transmitted acoustic tone is a first transmitted acoustic tone, wherein the method further includes transmitting a plurality of transmitted acoustic tones separated by a plurality of pauses, wherein each of the plurality of pauses has a pause duration, and further wherein the interrupting includes remaining in the active state responsive to the pause duration being less than the threshold active state duration.

12. The method of claim 1, wherein, responsive to not receiving an acoustic tone for the threshold active state duration, the method further includes returning to the cycling.

13. A well including a wireless acoustic telemetry network, the well comprising:
- a wellbore that extends within a subterranean formation; and
    - downhole acoustic wireless network including a plurality of nodes spaced-apart along a length of the wellbore, wherein at least one node of the plurality of nodes is programmed to perform the cycling and the receiving of claim 1, and further wherein an adjacent node of the plurality of nodes is configured to perform the transmitting of claim 1.

14. Non-transitory computer readable storage media including computer-executable instructions that, when executed, direct an acoustic wireless network to perform the method of any of claim 1.

* * * * *